United States Patent [19]
College et al.

[11] Patent Number: 5,645,807
[45] Date of Patent: Jul. 8, 1997

[54] MAGNESIUM-ENHANCED SULFUR DIOXIDE SCRUBBING WITH GYPSUM FORMATION

[75] Inventors: John W. College; Shiaw C. Tseng, both of Pittsburgh; Russell C. Forsythe, Ellwood City, all of Pa.

[73] Assignee: Dravo Lime Company, Pittsburgh, Pa.

[21] Appl. No.: 446,959

[22] Filed: May 24, 1995

Related U.S. Application Data

[63] Continuation of Ser. No. 234,932, Apr. 28, 1994, abandoned.

[51] Int. Cl.$^6$ .......................... C01B 17/22; C01F 11/36
[52] U.S. Cl. .................. 423/243.1; 423/243.03; 423/243.08; 423/555
[58] Field of Search ............. 423/243.03, 243.08, 423/555, 243.09, 243.01

[56] References Cited

U.S. PATENT DOCUMENTS

| | | | |
|---|---|---|---|
| 3,914,378 | 10/1975 | Selmeczi | 423/242 |
| 3,919,393 | 11/1975 | Selmeczi | 423/242 |
| 3,919,394 | 11/1975 | Selmeczi | 423/242 |
| 4,046,856 | 9/1977 | Itoo et al. | 423/166 |
| 4,164,549 | 8/1979 | Selmeczi | 423/242 |
| 4,696,804 | 9/1987 | Shinoda et al. | 423/243.08 |
| 4,976,936 | 12/1990 | Rathi et al. | 423/242 |
| 5,312,609 | 5/1994 | College | 423/243.08 |

FOREIGN PATENT DOCUMENTS 339683  11/1989  European Pat. Off. .......... 423/243.08

*Primary Examiner*—Gary P. Straub
*Attorney, Agent, or Firm*—Armstrong, Westerman, Hattori, McLeland & Naughton

[57] ABSTRACT

A wet scrubbing method for removal of sulfur dioxide from a gaseous stream uses a magnesium-enhanced lime scrubbing aqueous slurry, where a solids content in the aqueous slurry in a wet scrubbing unit is maintained at an amount of between 13 to 20 percent by weight. A bleed stream is removed from the aqueous scrubbing slurry at a pH of between 4.5–5.6 and fed to an oxidizing unit wherein calcium sulfite is oxidized to gypsum. The gypsum and residual solids in the discharge from the oxidizing unit are separated to produce a clarified solution, which is returned to the wet scrubbing unit.

10 Claims, 1 Drawing Sheet

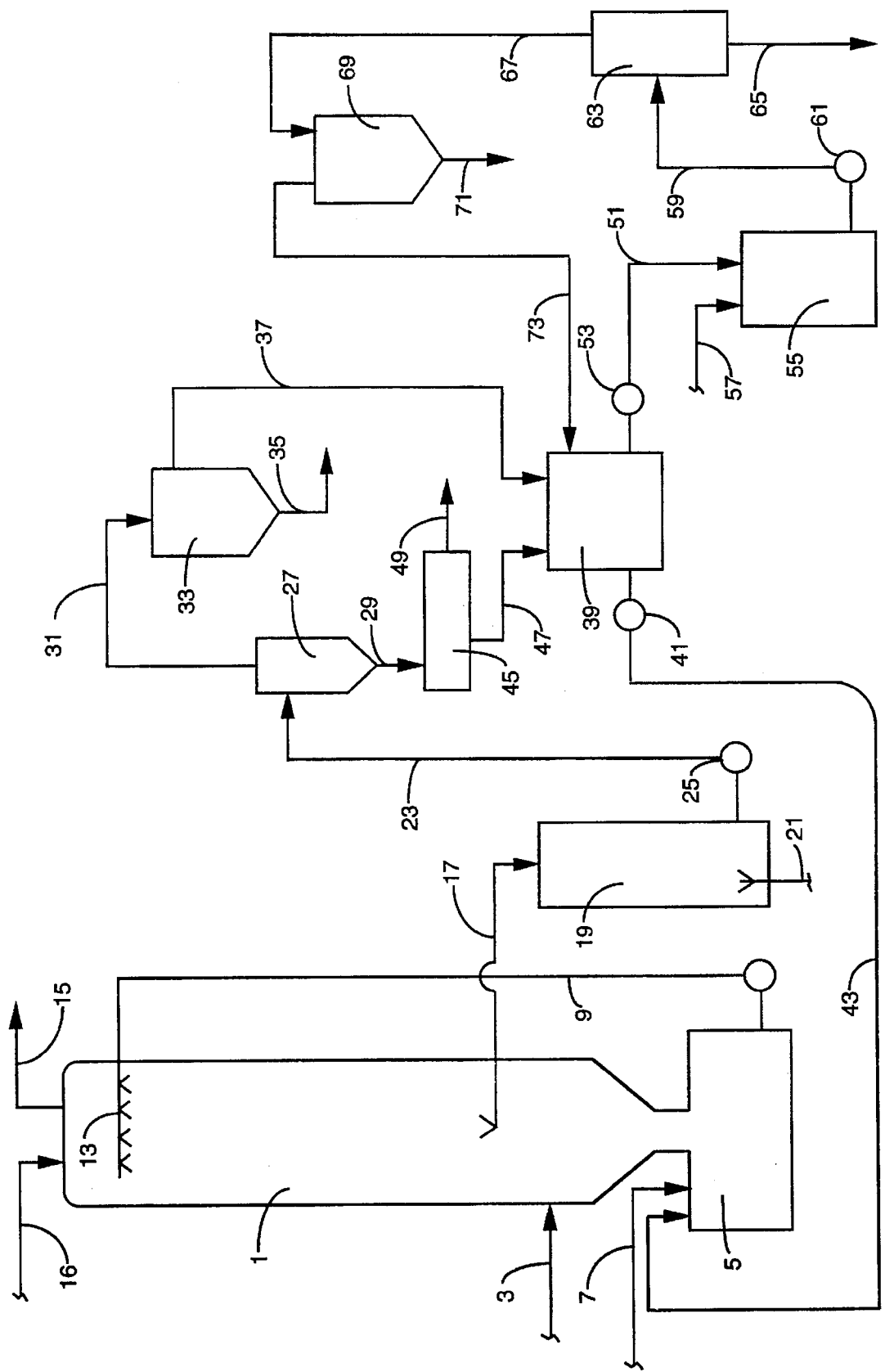

MAGNESIUM-ENHANCED SULFUR DIOXIDE SCRUBBING WITH GYPSUM FORMATION

This application is a continuation of application Ser. No. 234,932 filed Apr. 28, 1994, now abandoned.

FIELD OF THE INVENTION

The present invention relates to a method of removing sulfur dioxide from hot flue gases, and more specifically to a magnesium-enhanced lime scrubbing method for removing sulfur dioxide from a gaseous stream which produces gypsum as a by-product.

BACKGROUND OF THE INVENTION

The use of lime to remove sulfur dioxide from gaseous streams, such as combustion gas streams from combustion systems of power plants, is a proven technology which uses a wet scrubbing unit. Generally, an aqueous slurry of lime is charged to a wet scrubbing unit for countercurrent flow to a flue gas stream passing through the wet scrubbing unit, with formation of calcium sulfite and calcium bisulfite through reaction of the lime with the sulfur dioxide present in the flue gas. A major improvement in early such lime scrubbing processes was the provision of an effective amount of magnesium ions in the aqueous scrubbing slurry that significantly improved the efficiency of such processes. The magnesium-enhanced lime scrubbing processes, as described, for example, in U.S. Pat. Nos. 3,919,393 and 3,919,394 to Joseph Selmiezi, have become commercially accepted. In such magnesium-enhanced lime scrubbing processes for sulfur dioxide removal, the solids content of the aqueous scrubbing medium in the wet scrubbing unit is normally maintained with a range of about 3–10 percent by weight. Such magnesium-enhanced lime scrubbing processes normally produce a large supply of calcium sulfite which has either been disposed of in sludge ponding or has in one manner or another been transformed into a useful by-product, such as gypsum. In U.S. Pat. No. 4,976,936, to Ronald J. Rathi and Lewis B. Benson, for example, which is assigned to the assignee of the present invention, a calcium sulfite-containing aqueous discharge from a magnesium-enhanced lime scrubbing process is passed to a thickener and an aqueous sludge from the thickener is passed to a mixing tank where sulfuric acid is added to dissolve the calcium sulfite and the resultant solution is oxidized to produce a gypsum product that is separated from the aqueous media. Also, as described therein, if desired, a portion of the discharge from the scrubber may be passed directly to the mixing tank, by-passing the thickener, and mixed with sulfuric acid prior to oxidation. In such a process, a large scale thickener is required to handle the aqueous slurry discharged from the wet scrubbing unit and sulfuric acid must be added to the mixer.

SUMMARY OF THE INVENTION

The present invention is a method of operating a magnesium-enhanced lime scrubbing process for sulfur dioxide removal from flue gases while producing gypsum and optionally magnesium hydroxide by-products.

An aqueous slurry of magnesium-enhanced lime scrubbing medium is contacted with a flue gas containing sulfur dioxide in a wet scrubbing unit and the solids content of the aqueous slurry maintained at an amount of between 13 to 20 percent by weight. The solids produced will be primarily calcium sulfite with some other residual solids, while magnesium sulfite and magnesium sulfate present are in solution. A bleed stream of the aqueous slurry is removed from the recirculating liquor in the wet scrubbing unit and associated hold tank, at a location after contact of the slurry with the gases but prior to passage to the hold tank, and is passed directly to an oxidizing unit. In the oxidizing unit, the calcium sulfite present in the bleed stream is oxidized to gypsum (calcium sulfate). The gypsum and residual solids present are removed from the aqueous slurry to produce a clarified solution or aqueous liquor, which clarified aqueous liquor is returned to the wet scrubbing unit and mixed with the aqueous slurry therein.

By removing a portion or bleed stream of the aqueous slurry from the wet scrubbing unit after contact with the flue gases but prior to passage to the hold tank, the portion will be at a pH of about 4.5–5.6 and can be oxidized in the oxidizing unit without the need to add sulfuric or other acidic compounds to the oxidizing unit.

The clarified aqueous liquor resulting from a removal of the gypsum and residual solids may optionally be treated to produce a magnesium hydroxide salable by-product. The clarified aqueous liquor, containing dissolved magnesium sulfate, may be contacted with a lime slurry such that a reaction precipitates gypsum and provides a magnesium hydroxide suspension that is separated, clarified and collected for use or sale.

DESCRIPTION OF THE DRAWING

The invention will become more readily apparent from the following description of a preferred embodiment thereof shown, by way of example only, in the accompanying drawing which is a flow diagram illustrating a present preferred method of the present invention.

DETAILED DESCRIPTION

The present invention provides a magnesium-enhanced lime scrubbing method for removing sulfur dioxide from a gaseous stream while producing gypsum as a by-product and optionally also providing magnesium hydroxide as a by-product.

The magnesium-enhanced aqueous lime scrubbing medium used in the present method is a lime slurry containing magnesium ions such as scrubbing slurries described in the previously mentioned U.S. Pat. No. 3,919,393, U.S. Pat. No. 3,919,394, U.S. Pat. No. 3,914,378 and U.S. Pat. No. 4,976,936, all of which are incorporated by reference herein. The magnesium ion content of the aqueous scrubbing medium in the present process would be between about 2500–15000 parts per million (ppm).

Referring now to the drawing, the present method is schematically illustrated, showing a wet scrubbing unit 1 to which a sulfur dioxide-containing gas, such as a combustion flue gas, is charged through line 3. An aqueous scrubbing medium, in the form of an aqueous slurry of magnesium-enhanced lime is added to a hold tank 5 through line 7, and aqueous scrubbing slurry is passed through line 9 from the hold tank 5 by means of pump 11 to spray nozzles 13 in the wet scrubbing unit 1. The aqueous slurry of magnesium-enhanced lime contacts the flue gas in the wet scrubbing unit 1 to remove sulfur dioxide therefrom, with clean gas discharged from the wet scrubbing unit 1 through discharge line 15. Fresh water, if desired, may be added to the wet scrubbing unit 1 through line 16 to wash demister units (not shown) at the upper region of the wet scrubbing unit 1. In accordance with the present method, the solids content of the aqueous scrubbing slurry in the wet scrubbing unit 1 is permitted to rise to a level of between 13–20 percent by weight, which solids comprise primarily calcium sulfite (primarily calcium sulfite hemihydrate: $CaSO_3 \cdot \frac{1}{2}H_2O$), with magnesium sulfite and magnesium sulfate in solution. The pH of the aqueous scrubbing slurry in the wet scrubbing unit is maintained at a pH of between 4.5 to 5.6, preferably between 5.0 to 5.5, while the pH of the medium in the hold tank 5, to which effluent from the wet scrubbing unit 1 is passed, will be at a slightly higher value, such as between about 5.5–6.0 due to the addition of magnesium-enhanced lime slurry through line 7.

A bleed stream of aqueous slurry is removed from the wet scrubbing unit 1 through line 17, which bleed stream is at a pH of between 4.5 to 5.6, and preferably between 5.0 to 5.5, and contains 13–20 percent by weight of calcium sulfite solids along with dissolved magnesium sulfite and magnesium sulfate. This bleed stream is passed through line 17 directly to an oxidizing unit 19. An advantage of operating the wet scrubbing unit at a solids content of between 13–20 percent by weight and removing the bleed stream with such a solids content is the formation in the aqueous scrubbing slurry of very fine $CaSO_3 \cdot \frac{1}{2}H_2O$ particles therein. These very small particles (about 5 microns vs normal solids sizes of about 12–20 microns) will dissolve more readily in the oxidizing unit. In the oxidizing unit 19, air, which may be oxygen-enriched, is charged through line 21, so as to oxidize calcium sulfite to calcium sulfate and magnesium sulfite to magnesium sulfate, with the solids content of the aqueous slurry increasing to about 17–26 percent by weight of calcium sulfate, and with the magnesium sulfate dissolving in the aqueous medium. The oxidized aqueous slurry is discharged from the oxidizing unit 19 through line 23, and by means of pump 25 is fed to a solids separator 27 such as a hydroclone, where gypsum and any residual solids are removed and discharged through line 29, while a clarified liquor produced is discharged through line 31. The clarified liquor from line 31, which may contain about 1–2 percent by weight of fine solids is passed to a fines separator 33. Fine solid material separated in the fines separator 33 is discharged through line 35 as a waste material, while the clarified solution resulting from the separation therein is fed through line 37 to a supply of make-up process water tank 39 for use in the wet scrubbing unit 1. The clarified solution from make-up process water tank 39 is returned to the wet scrubbing unit 1 by means of pump 41 in line 43, to the wet scrubbing unit 1 by means of pump 41 in line 43, preferably by adding the same to the hold tank 5.

In order to provide further make-up process water to the wet scrubbing unit 1, the gypsum in line 29 from the solids separator 27, which will normally be a wet solid component containing about 60–75 percent by weight of water, is filtered on a filter 45, with filtrate passing through line 47 to the make-up process water tank 39, while the filter cake of gypsum is removed through line 49 for collection.

A benefit of the present method is the ability to collect magnesium from the clarified solution as magnesium hydroxide which may be used in the wet scrubbing unit or may be sold as a valuable by-product. As illustrated, clarified solution, or a portion thereof, fed to the make-up process water tank 39 may be discharged through line 51 and, by means of pump 53, fed to a regeneration tank 55. In the regeneration tank 55, magnesium sulfate contained in the clarified solution is reacted with a lime slurry fed through line 57 so as to produce a precipitated gypsum solid and magnesium hydroxide. The reacted material from regeneration tank 55 is fed through line 59, by means of pump 61, to a further solids separator 63, such as a hydroclone, where gypsum solids are separated and discharged through line 65, while a resulting magnesium hydroxide aqueous suspension is passed through line 67 to a magnesium hydroxide separating unit 69. In the magnesium hydroxide separating unit 69, magnesium hydroxide is separated from the resultant aqueous medium and discharged through line 71 for re-use or sale, while the aqueous medium is passed through line 73 to the make-up process water tank 39 for use in the wet scrubbing unit 1.

The present method has distinct advantages over prior art processes where oxidation of calcium sulfite from a magnesium-enhanced lime scrubbing process has been effected. A primary example is the fact that a large volume thickener or solids separator is not required to concentrate a calcium sulfite sludge that is subsequently oxidized, such as is used in U.S. Pat. No. 4,976,936. With use of the hydroclone, only a small thickener or clarifying tank is required to remove fines or residual solids from the aqueous liquor. Another advantage is the avoidance of dilution or recirculation of acidic liquors to the oxidizing unit. Since the bleed stream from the downcomer is at a pH of 4.5–5.6, about three-fourths of the sulfite ions ($SO_3^=$) in solution in the bleed stream would be in the form of $HSO_3^-$ which would readily oxidize to $H_2SO_4$:

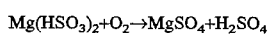
$$Mg(HSO_3)_2 + O_2 \rightarrow MgSO_4 + H_2SO_4$$

such that there will be sufficient acid produced in situ to neutralize any calcium carbonate that may be formed at the pH of about 6 in the wet scrubber. The acid so produced will dissolve the calcium carbonate and ultimately allow the digestion of the $CaSO_3$ in the oxidizing unit.

A tight water balance is maintained in the system such that a high concentration of dissolved salts, principally magnesium salts, is maintained in the wet scrubbing unit. As an optional step, the separated, wet, gypsum solids from line 65 may be returned, along with residual water, to the wet scrubbing unit 1. These gypsum solids will provide seed crystals for oxidation, following subsequent removal in the bleed stream, in the oxidizing unit 19, and will carry some residual magnesium hydroxide (about 1–2 percent by weight) that supplements the magnesium in the magnesium-enhanced lime added to the scrubbing system. These returned gypsum solids will then be substantially removed with the gypsum solids removed through line 49.

As described, the present method provides a magnesium-enhanced lime scrubbing method to remove sulfur dioxide from a gaseous stream and produces gypsum, while recovering magnesium hydroxide, while using low volume settling devices for ready removal of the system solids.

What is claimed is:

1. A method of removing sulfur dioxide from a gaseous stream with a magnesium-enhanced lime scrubbing medium so as to produce a gypsum by-product comprising:

passing said gaseous stream through a wet scrubbing unit while contacting said gaseous stream with an aqueous slurry of magnesium-enhanced lime, where said aqueous slurry contains between 13–20 percent by weight calcium sulfite solids, and with magnesium sulfite and magnesium sulfate dissolved therein;

directing said aqueous slurry, after contact with said gaseous stream, to a hold tank and adding lime and magnesium thereto to replenish reacted lime and magnesium;

recycling said replenished aqueous slurry to said wet scrubbing unit for further contact with said gaseous stream passing therethrough;

removing a bleed stream of said aqueous slurry, containing calcium sulfite, magnesium sulfite and magnesium sulfate, and having a pH of between 4.5–5.6, from said wet scrubbing unit, after contact with said gaseous stream and prior to directing the same to said hold tank;

passing the removed aqueous slurry directly to an oxidizing unit, without separation of calcium sulfite solids, magnesium sulfite and magnesium sulfate therefrom;

oxidizing said calcium sulfite and magnesium sulfite to produce gypsum and magnesium sulfate, said gypsum precipitating as a solid and said magnesium sulfate dissolving in said aqueous medium;

removing any residual solids and said gypsum from said aqueous slurry to produce a clarified solution;

separating said gypsum from residual aqueous medium and returning said separated aqueous medium to said wet scrubbing unit; and returning said clarified solution along with said separated aqueous medium to said wet scrubbing unit for admixture with said aqueous slurry.

2. The method as defined in claim 1 wherein said pH is between 5.0–5.5.

3. The method as defined in claim 1 wherein the aqueous slurry after oxidization contains 17–26% by weight of solids comprising calcium sulfite, magnesium sulfite, calcium sulfate and magnesium sulfate.

4. The method as defined in claim 1 wherein a portion of said clarified solution is contacted with an aqueous lime slurry to precipitate gypsum solids and produces magnesium hydroxide, separating said gypsum solids therefrom and recovering magnesium hydroxide from the resultant aqueous medium.

5. The method as defined in claim 4 wherein said resultant aqueous medium is fed to said wet scrubbing unit.

6. The method as defined in claim 4 wherein at least a portion of said gypsum solids, produced by reaction of an aqueous lime slurry and said clarified solution, is fed to said wet scrubbing unit.

7. A method of removing sulfur dioxide from a gaseous stream with a magnesium-enhanced lime scrubbing medium so as to produce a gypsum by-product comprising:

passing said gaseous stream through a wet scrubbing unit while contacting said gaseous stream with an aqueous slurry of magnesium-enhanced lime, where said aqueous slurry contains between 13–20 percent by weight calcium sulfite solids, and with magnesium sulfite and magnesium sulfate dissolved therein;

directing said aqueous slurry, after contact with said gaseous stream, to a hold tank and adding lime and magnesium thereto to replenish reacted lime and magnesium;

recycling said replenished aqueous slurry to said wet scrubbing unit for further contact with said gaseous stream passing therethrough;

removing a bleed stream of said aqueous slurry, containing calcium sulfite, magnesium sulfite and magnesium sulfate having a pH of between 4.5–5.6, from said wet scrubbing unit, after contact with said gaseous stream and prior to directing the same to said hold tank;

passing the removed aqueous slurry directly to an oxidizing unit, without separation of calcium sulfite solids, magnesium sulfite and magnesium sulfate therefrom;

oxidizing said calcium sulfite and magnesium sulfite to produce gypsum and magnesium sulfate, said gypsum precipitating as a solid and said magnesium sulfate dissolving in said aqueous medium, and to obtain an oxidized slurry containing 17–26% by weight of solids;

removing any residual solids and said gypsum from said aqueous slurry to produce a clarified solution; and returning said clarified solution to said wet scrubbing unit for admixture with said aqueous slurry.

8. The method as defined in claim 7 wherein a portion of said clarified solution is contacted with an aqueous lime slurry to precipitate gypsum solids and produce magnesium hydroxide, separating said gypsum solids therefrom and recovering magnesium hydroxide from the resultant aqueous medium.

9. The method as defined in claim 7 wherein said resultant aqueous medium is fed to said wet scrubbing unit.

10. The method as defined in claim 7 wherein at least a portion of said gypsum solids, produced by reaction of an aqueous lime slurry and said clarified solution, is fed to said wet scrubbing unit.

\* \* \* \* \*